United States Patent Office 2,921,898
Patented Jan. 19, 1960

2,921,898
DRILLING FLUID AND METHOD OF USE

Walter J. Weiss, Sugar Land, Tex., assignor to Texaco, Inc., a corporation of Delaware No Drawing. Application December 4, 1957
Serial No. 700,542

7 Claims. (Cl. 252—8.5)

This invention relates to drilling fluids and to a drilling method employing drilling fluids. More particularly, this invention relates to drilling fluids having an improved water loss and method of preparing same.

A drilling fluid particularly useful for drilling through heaving shale comprises an alkaline aqueous phase which is saturated with respect to calcium hydroxide, possesses a pH not greater than 12.6, preferably in the range 10.6–11.2, and contains a dissolved calcium or calcium ion concentration in excess of 200 parts per million by weight, preferably in the range 300–1500 p.p.m. A drilling fluid of this type contains hydratable clayey material such as a drilling clay or bentonite dispersed in the alkaline aqueous phase thereof. Because of the relatively high ion or dissolved calcium ion concentration of the aqueous phase the clayey material dispersed therein tends to be or is flocculated, thereby imparting a relatively high water loss to the drilling fluid. By means of suitable dispersants, such as a sodium salt of a polymeric polyphenol derivative obtained as an extract of hemlock bark, commercially available under the trade name of "Rayflo" and sold by the Rayonier Company, and other suitable dispersants, such as the alkali metal and alkaline earth lignosulfonates, e.g., sodium lignosulfonate and calcium lignosulfonate, the flocculating tendency of the relatively high dissolved calcium concentration in the aqueous phase upon the hydratable clayey material therein is inhibited. The resulting drilling fluid, however, although a stabilized flocculated system, is still characterized by a relatively high water loss.

A drilling mud containing flocculated hydratable clayey material therein and characterized by a relatively high water loss is not usually desirable in a drilling operation. When a drilling fluid characterized by a relatively high water loss is employed in a drilling operation, due to filtrate loss into the underground formation being drilled a mud cake or mud sheath tends to build-up on the wall of the bore hole. As this mud sheath or mud cake increases in thickness due to continued loss of filtrate into the formation the clearance between the drill string and the wall of the bore hole becomes less. It is possible in some instances due to reduced clearance between the drill string and the wall of the bore hole, due to build up of a mud cake thereon, for the drill string to become stuck. When this occurs the drilling operation stops. In some instances during the drilling operation the frictional drag between the drill string and the mud sheath covering the bore hole becomes so great that the drill string is sheared or broken during the drilling operation. Further, due to excessive build up of mud cake on the wall of the bore hole, a substantial amount of power is consumed just to overcome the frictional resistance between the drill string and the mud cake lining the bore hole.

Accordingly, it is an object of this invention to provide an improved drilling fluid characterized by a relatively low filtration or water loss and method of preparing same.

Another object of this invention is to provide an improved drilling fluid characterized by an alkaline aqueous phase having a relatively high dissolved calcium concentration therein, yet characterized by a relatively low water loss.

Yet another object of this invention is to provide a method for decreasing filtration or water loss in an aqueous drilling mud containing hydratable flocculated clayey material dispersed in an alkaline aqueous phase having a relatively high calcium concentration.

Still another object of this invention is to provide an improved drilling fluid suitable for use in a drilling operation while drilling through heaving shale.

How these and other objects of this invention are accomplished will become apparent in the light of the accompanying disclosure. In at least one embodiment of the practice of this invention at least one of the foregoing objects will be achieved.

In accordance with this invention it has now been discovered that sulfated ethyl cellulose when added to an aqueous drilling fluid which contains hydratable clayey material dispersed in an alkaline aqueous phase, said aqueous phase having a pH not in excess of 12.6, being saturated with calcium hydroxide and containing a dissolved calcium or calcium ion concentration in excess of 200 parts per million by weight, yields a drilling fluid characterized by a relatively reduced water loss.

As indicated hereinabove the practice of this invention is particularly applicable to drilling fluids which have been found to be particularly useful while drilling through heaving shale material. This particularly useful drilling fluid containing a stabilized dispersion of flocculated hydratable clayey material dispersed in an alkaline aqueous phase evidences a substantially reduced filtration loss or water loss when a minor amount of sulfated ethyl cellulose is incorporated therein. Any suitable minor amount of sulfated ethyl cellulose effective to yield the desired water loss or filtration loss characteristic in the finished drilling fluid might be employed. Usually a minor amount of sulfated ethyl cellulose in the range 0.25–5.0 lbs. per barrel of drilling fluid (42 gals. per barrel) yields satisfactory results, although smaller and larger amounts of sulfated ethyl cellulose, e.g. as small as 0.125 and as large as 15.0 lbs. per bbl. of drilling fluid might be employed depending upon the water loss characteristics desired in the finished treated drilling fluid.

The aqueous drilling fluids which are improved with respect to filtration loss are completely described in U.S. Patent 2,802,783 issued August 13, 1957. The disclosures of the above-identified patent, particularly with respect to the drilling fluid and drilling fluid compositions set forth therein, are herein incorporated and made a part of this disclosure. As indicated in the above-identified patent, the upper limiting pH of the alkaline aqueous phase of such drilling fluids is 12.6, the pH corresponding to a saturated aqueous solution of calcium hydroxide. Very satisfactory drilling fluids, however, have been obtained when the pH of the aqueous phase of such drilling fluids is in the range 10.6–11.2.

The relatively high dissolved calcium or calcium ion concentration in the aqueous phase of the drilling fluid, above 200 p.p.m., is obtained by dissolving in the aqueous phase thereof a relatively water soluble calcium salt having a solubility greater than that of calcium hydroxide. Suitable water soluble calcium salts include calcium chloride, calcium formate, calcium nitrate, calcium acetate and calcium gluconate. Other suitable water soluble salts are known and may be employed in the practice of this invention. The flocculated clayey material dispersed in the alkaline aqueous phase of drilling muds prepared in accordance with this invention are stabilized therein by incorporating in the drilling fluids suitable active dispersing agents for such clayey materials. Lignosulfonates, such as calcium lignosulfonate, are particularly useful as a clay dispersing agent in such systems. A suitable calcium lignosulfonate sold under the trade name Kembreak is particularly useful. Other lignosulfonates such as a ferro-chrome lignosulfonate sold under the trade name Q-Broxin are also useful for the preparation of relatively low water loss drilling fluids prepared in accordance with this invention.

The following test data illustrate the effectiveness of sulfated ethyl cellulose as a water loss additive in a high calcium drilling mud in accordance with this invention. Portions of a base aqueous drilling mud containing about 17% by weight clay solids dispersed in an alkaline aqueous phase saturated with calcium hydroxide and having a calcium ion content therein above 200 p.p.m., in the range 300–1000 p.p.m., the pH of the aqeuous alkaline phase being not greater than 12.6, the hydratable clayey material being dispersed in said aqueous phase by means of a suitable dispersing agent, calcium lignosulfonate, were treated with varying amounts of carboxymethylcellulose (CMC), a well known water loss additive, and varying amounts of sulfated ethyl cellulose. The water loss properties of the resulting muds were then tested in an A.P.I. water loss tester at a pressure of 100 p.s.i.g. applied for varying periods of time. The results of these tests are set forth in Tables I and II.

Table I

| Carboxymethyl-cellulose added, lbs./API bbl. | Mud Vis. @ 600 r.p.m. in cpe. | Filtration Loss, API, cc./7.5 min. |
|---|---|---|
| 0 | 20.0 | 24.4 |
| ¼ | 32.2 | 23.2 |
| ½ | 49.4 | 21.6 |
| ¾ | 61.1 | 15.6 |
| 1 | 85.1 | 11.6 |
| 2 | 181.0 | 37.2 |

Table II

| Sulfated ethyl cellulose in lbs./API bbl. | Mud Vis. @ 600 r.p.m. in cpe. | Filtration Loss, API, cc./7.5 min. |
|---|---|---|
| ¼ | 24.0 | 20.0 |
| ½ | 25.8 | 16.0 |
| ¾ | 28.3 | 12.0 |
| 1 | 29.7 | 10.8 |
| 2 | 44.0 | 7.0 |

As indicated in the foregoing test data, a conventional water loss additive, carboxymethylcellulose, proved to be ineffective in reducing water loss in an alkaline aqueous drilling mud characterized by a relatively high dissolved calcium content. On the other hand, sulfated ethyl cellulose when added to such alkaline aqueous drilling fluids in accordance with this invention yielded drilling muds which showed a progressive decrease in water loss as the amount of sulfated ethyl cellulose incorporated therein was increased. For example, at a dosage of 1 lb. of sulfated ethyl cellulose per barrel of aqueous drilling mud the water loss of the resulting treated mud was less than one-half that exhibited by the untreated mud during an equivalent period of time. Further, when 2 lbs. of sulfated ethyl cellulose was added to the drilling mud the water loss for substantially the same period of time (7.5 min.) was reduced to a relatively insignificant amount.

As will be apparent to those skilled in the art many changes, modifications and improvements are possible in the practice of this invention without departing from the spirit or scope thereof.

I claim:

1. An aqueous drilling fluid comprising hydratable clayey material dispersed in an alkaline aqueous phase, said aqueous phase having a pH not in excess of 12.6, being saturated with calcium hydroxide and having an amount of a water soluble calcium salt dissolved therein to yield a calcium ion concentration in excess of 200 parts per million by weight, and a minor effective amount of sulfated ethyl cellulose as a water loss additive.

2. An aqueous drilling fluid composition in accordance with claim 1 wherein said sulfated ethyl cellulose is incorporated in said drilling fluid in an amount in the range 1–25% by weight.

3. A drilling fluid composition in accordance with claim 1 wherein said sulfated ethyl cellulose is incorporated in said drilling fluid in an amount in the range 0.25–5.0 lbs. per barrel of drilling fluid.

4. A composition in accordance with claim 1 wherein said drilling fluid contains oil emulsified in the aqueous phase thereof.

5. A drilling fluid composition in accordance with claim 1 wherein said water soluble calcium salt is selected from the group consisting of calcium chloride, calcium sulfate, calcium nitrate, calcium acetate and calcium formate.

6. In a drilling operation wherein an aqueous drilling fluid is circulated down the drill string, about the drilling bit and back to the surface and wherein a portion of the drilling fluid tends to be lost by filtration into the underground formation being drilled, the improvement which comprises employing as said drilling fluid an aqueous drilling fluid comprising hydratable clayey material dispersed in an alkaline aqueous phase, said aqueous phase having a pH not in excess of 12.6, being saturated with calcium hydroxide and having an amount of a water soluble calcium salt dissolved therein to yield a calcium ion concentration in excess of 200 parts per million by weight, and a minor effective amount of a sulfated ethyl cellulose incorporated in said drilling fluid as a water loss additive.

7. A method in accordance with claim 6 wherein said sulfated ethyl cellulose is incorporated in said drilling fluid in an amount in the range 0.25–5.0 lbs. per barrel (42 gals.) of drilling fluid.

References Cited in the file of this patent

UNITED STATES PATENTS

| 2,425,768 | Wagner | Aug. 19, 1947 |
| 2,560,612 | Wagner et al. | July 17, 1951 |
| 2,570,492 | Scarth | Oct. 9, 1951 |
| 2,626,239 | Wagner et al. | Jan. 3, 1953 |
| 2,687,375 | Fischer | Aug. 24, 1954 |
| 2,753,337 | Klug | July 3, 1956 |
| 2,771,420 | Rowe | Nov. 20, 1956 |
| 2,802,783 | Weiss et al. | Aug. 13, 1957 |